Figure 1:
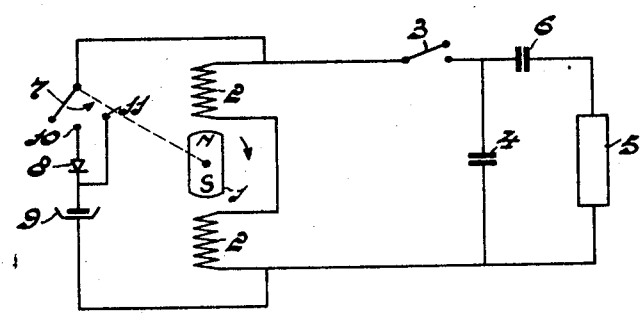

INVENTOR.
MAXIMILIEN FELIX REIJNST
ROBERT HENRI DE BEER
BY

AGENT

Patented Sept. 2, 1952

2,609,411

UNITED STATES PATENT OFFICE 2,609,411

METHOD OF MAGNETIZING PARTLY DEMAGNETIZED PERMANENT FIELD MAGNETS IN ALTERNATING CURRENT GENERATORS

Maximilien Félix Reijnst and Robert Henri de Beer, Eindhoven, Netherlands, assignors to Hartford National Bank and Trust Company, Hartford, Conn., as trustee Application November 22, 1949, Serial No. 128,885
In the Netherlands December 13, 1948

9 Claims. (Cl. 171—209)

This invention relates to methods of magnetising partly demagnetised permanent field magnets in alternating current generators, and also to devices for carrying out said methods. In German Patent Specification No. 663,954, it is stated that in an alternating current generator a partly demagnetised permanent field magnet can be completely remagnetised by connecting the terminals of the generator winding across a condenser, while the generator is running. In this manner a leading alternating current passes through the windings, which current has magnetising effect on the permanent magnet. Although this often gives satisfactory results, particularly if the magnet is not excessively demagnetised, remagnetisation of the magnet in this manner is not always sufficient for attaining the initial working point. Excessive demagnetisation may, inter alia, be due to short-circuits in the load circuit of the generator, the demagnetisation depending upon the nature, duration and the instant of the short-circuits.

The said German patent specification also states that for magnetising the permanent magnets in the generator, it is also possible to connect the winding of the generator to a separate source of direct current, when the generator rotor is stationary.

The object of the present invention is to provide an improved method of remagnetisation, in which it is not necessary to provide a separate source of direct current.

According to the invention, a method of magnetising partly demagnetised permanent field magnets in an alternating current generator, is characterized in that at least part of the residual voltage of the generator, while running, is supplied, through a switch element and a rectifier, to a condenser and the latter is subsequently discharged at least across part of a winding of the generator, so that the permanent magnets are remagnetised.

If remagnetisation is insufficient, for example because the position of a permanent magnet at the instant of discharge is unfavourable with respect to the field direction of magnetisation, the procedure may be repeated one or more times. To mitigate this possible disadvantage, the discharge of the condenser may be effected, by means of an automatic switch, at the instant the position of the magnet is optimum with respect to the magnetising winding. Such an automatic switch may consist, for example, of a rotary contact coupled to the generator shaft. This is of particular importance with the use of anisotropic magnet steels, since in this case the magnetisation is optimum in the preferential direction.

If the use of such an automatic and synchronously operating switch is deemed undesirable, for example for economic reasons, the condenser may be charged and switched out of circuit, the generator then being stopped.

Owing to the abrupt discharge of the condenser across part of the winding or the whole pole winding, a field is generated in the iron circuit. If the position of the immobilised magnet is not optimum, the latter may be attracted into the correct position with respect to the pole winding and is magnetised in that position. If a single magnetisation proves insufficient, the aforesaid cycle may be repeated. If the magnet occupies the reversed position with respect to the pole winding, for example with a north pole directly opposite a north pole of the pole winding formed by the condenser discharge, the magnetisation of the magnet will be reversed. In general, however, a single condenser discharge will not be sufficient, so that in this case, too, the cycle should be repeated, care being taken that the magnet resumes the same position with respect to the pole winding as during previous discharge(s). If, upon a second discharge, the magnet occupies a position more favourable than the reversed position, the magnet may again be drawn automatically into the correct position in the magnetising field. It is pointed out that it may be advisable, upon the condenser discharge, to connect the generator windings in a manner different from that when the generator is working (in series or parallel) such that the magnetisation current impulse is optimum.

In this manner a sufficient voltage and charge of the condenser permits substantially full remagnetisation of the permanent magnets without the need for a separate source of current.

A further advantage is that the permanent magnet of the generator may act in the optimum area in the proximity of the $(BH)_{max}$ point of the demagnetisation curve so that, in designing the generator, it be given the smallest possible size, since after any demagnetisation, the likelyhood of which—for example in the case of short-circuits of the load—is greater as the working points is nearer to the $(BH)_{max}$ point, the magnet can be remagnetised by the user in a simple manner.

To avoid the possibility, with a simple construction without a synchronised automatic discharge switch, of requiring more than one magnetisation operation to remagnetise a permanent magnet it is advisable, according to a further feature of the invention, that after charging the condenser and immobilising the generator, a permanent magnetic pole of the magnet should be mechanically brought into the correct position of magnetisation with respect to the magnetising winding, or conversely. The term "mechanically" is to be understood to include manual adjustment. The rotor may be provided with indication means for determining the correct position.

Sometimes it may occur that the residual voltage of the generator is too low for full remagnetisation of the permanent magnet with a given capacity of the condenser. In this event, at least part of the generator voltage supplied to the rectifier and the condenser, may be converted into a voltage exceeding the residual voltage of the generator so that a greater quantity of energy is accumulated in the condenser.

The invention also relates to a device for carrying out the method according thereto with the use of an alternating current generator comprising permanent magnets, in which at least part of the winding of the generator is connected, by way of a switch element, to the series-arrangement of a rectifier and a condenser, a second switch element being provided to discharge the condenser at least across part of a generator winding.

The working point of the permanent magnet of the generator preferably lies in the proximity of the $(BH)_{max}$ of the demagnetisation curve. In such a generator, the permanent magnet may be remagnetised at any time by the user, so that in choosing the working point of the magnet only the fuel load current and not any possible short-circuit currents need be taken into account. This enables the magnet to operate nearer to the $(BH)_{max}$ point.

In order that the invention may be more clearly understood and carried into effect it will now be described more fully with reference to the accompanying drawing, wherein two embodiments thereof are represented diagrammatically.

In Fig. 1, an alternating current generator comprises a permanent magnetic rotor 1, operating substantially at the $(BH)_{max}$ point and having poles N and S, and two windings 2. The load 5 is adapted to be connected to the generator by way of a switch 3, a condenser 4 being connected in parallel with the generator and a condenser 6 being connected in series with the load 5. The use of condensers 4 and 6 has previously been proposed to reduce any detrimental demagnetisation of the rotor 1 in the case of short-circuits of the load 5 or its supply conductors. Despite these precautions, detrimental demagnetisation may sometimes occur to a degree such that the working point of the magnet becomes displaced from the $(BH)_{max}$ area and the generator supplies an excessively low voltage. For substantially full remagnetisation of the magnet, the series-connection of a switch 7, a dry rectifier 8 and an electrolytic condenser 9 is arranged, as an auxiliary apparatus, in parallel with the windings 2. When switch 3 is opened and switch 7 is closed by way of contact 10, the condenser 9 is charged with direct voltage to the residual voltage of the generator. To prevent this voltage from leaking away by way of rectifier 8, the switch 7 may again be opened by movement of the contact arm to a position between contacts 10 and 11. Subsequently, the generator is immobilised and, by means of a mark, a stop or the like, the permanent magnetic rotor 1 is brought into the position, in which it is to be remagnetised, between the two pole windings 2. After that, switch 7 is closed by way of contact 11, due to which the condenser 9 becomes discharged through the windings 2 and the rotor is magnetised.

Switch 7 may be mounted directly on the rotor shaft and arranged to close contacts 10 and 11 respectively at the correct times so that the condenser is charged and then discharged through the windings 2 when they are most favorably disposed with respect to the permanent magnets. This arrangement is schematically indicated by the dashed line representation linking switch 7 to the shaft of the rotor.

Figure 2:
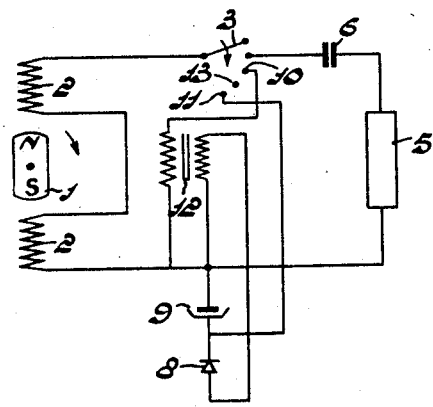

In Fig. 2, corresponding parts to those of Fig. 1 bear the same reference numerals as in Fig. 1. It is assumed that the permanent magnet is demagnetised to a degree such that, with a given practical size of the electrolytic condenser 9, the residual voltage is too low to give this condenser a charge sufficient for remagnetisation of the magnet. In the position in which the switch 3 is closed by way of contact 10, the primary of a transformer 12 is therefore connected to the generator. The secondary of this transformer supplies a voltage much higher than the residual voltage of the generator which voltage charges the condenser 9 by way of the rectifier 8. By placing the switch 3 on contact 13, as a result of which the transformer 12 is disengaged and the generator with the rotor is immobilised in the correct position of magnetisation, magnetisation may be effected by closing the switch by way of contact 11.

What we claim is:

1. A method of magnetising partly demagnetised permanent field magnets in an alternating-current generator, comprising the steps of operating the generator to produce a residual voltage across the terminals thereof, rectifying a portion of the said residual voltage to produce a unidirectional voltage therefrom, charging a capacitor with the rectified residual voltage portion until said capacitor is fully charged, and thereafter discharging the capacitor across a portion of the generator winding to remagnetise the permanent magnets.

2. A method of magnetising partly demagnetised permanent field magnets in an alternating-current generator, comprising the steps of operating the generator to produce a residual voltage across the terminals thereof, rectifying a portion of the said residual voltage to produce a unidirectional voltage therefrom, charging a capacitor with the rectified residual voltage portion until said capacitor is fully charged, and thereafter discharging the capacitor across a portion of the generator winding at an instant at which the position of one of the permanent magnets is favorable with respect to that portion of the winding.

3. A method of magnetising partly demagnetised permanent field magnets in an alternating-current generator, comprising the steps of operating the generator to produce a residual voltage across the terminals thereof, rectifying a portion of the said residual voltage to produce a unidirectional voltage therefrom, charging a capacitor with the rectified residual voltage portion until said capacitor is fully charged, isolating said capacitor from said generator, immobilising the generator for a predetermined period of time, and discharging the capacitor across a portion of the generator winding while the generator is immobilised to magnetise the permanent magnets thereof.

4. A method of magnetising partly demagnetised permanent field magnets in an alternating-current generator, comprising the steps of operating the generator to produce a residual voltage acoss the terminals thereof, rectifying a portion of the said residual voltage to produce a unidirectional voltage therefrom, charging a capacitor with the rectified residual voltage portion until said capacitor is fully charged, isolating said capacitor from said generator, immobilising the generator for a predetermined period of time, placing the pemanent magnets in optimum relationship for remagnetisation, and discharging the capacitor through the generator winding to magnetise the permanent magnets.

5. A method of magnetising partly demagnetised permanent field magnets in an alternating current generator, comprising the steps of operating the generator to produce a residual voltage across the terminals thereof, transforming said residual voltage to a voltage of greater magnitude, rectifying the so produced voltage to produce a unidirectional voltage therefrom, charging a capacitor with the unidirectional voltage until the capacitor is fully charged, and thereafter discharging the capacitor across a portion of the generator winding to remagnetise the permanent magnets.

6. A device for magnetising partly demagnetised permanent field magnets of an alternating-current generator comprising means to derive a residual voltage from the generator, means to rectify a portion of the residual voltage to produce a unidirectional voltage therefrom, a capacitor in series with said rectifying means, and means to selectively connect said capacitor through said rectifying means to said generator winding in order to discharge the capacitor across the latter.

7. A device for magnetising partly demagnetised permanent field magnets of an alternating-current generator comprising means to derive a residual voltage from the generator, means to rectify a portion of the residual voltage to produce a unidirectional voltage therefrom, a capacitor in series with said rectifying means, means to connect said capacitor through said rectifying means to said generator for charging the same, and synchronized switch means coupled to the generator for connecting the capacitor across a portion of the generator field winding to discharge the same when the magnets occupy a favorable position with respect to the winding portion.

8. A device for magnetising partly demagnetised permanent field magnets of an alternating-current generator comprising means to derive a residual voltage from the generator, means to rectify a portion of the residual voltage to produce a unidirectional voltage therefrom, a capacitor in series with said rectifying means, means to connect said capacitor through said rectifying means to said generator for charging the same, means to place the permanent magnets in a position favorable with respect to a portion of the generator winding to effect magnetisation thereof, and means to connect the capacitor to the winding portion to effect magnetisation of the permanent magnets.

9. A device for magnetising partly demagnetised permanent field magnets of an alternating-current generator comprising means to derive a residual voltage from the generator, means to transform the magnitude of the residual voltage to a voltage of greater magnitude, means to rectify the latter voltage to produce a unidirectional voltage therefrom, a capacitor in series with said rectifying means, means to connect said capacitor through said rectifying means to said generator for charging the same, and means to discharge said capacitor across a portion of the generator winding to effect magnetisation of the permanent magnets.

MAXIMILIEN FÉLIX REIJNST.
ROBERT HENRI DE BEER.

REFERENCES CITED

The following references are of record in the file of this patent:

UNITED STATES PATENTS

| Number | Name | Date |
|---|---|---|
| 1,513,633 | Scheller | Oct. 28, 1924 |
| 2,247,745 | Brader | July 1, 1941 |
| 2,326,696 | Stoddard | Aug. 10, 1943 |
| 2,383,492 | Klemperer | Aug. 28, 1945 |
| 2,486,656 | Klinkhammer | Nov. 1, 1949 |

FOREIGN PATENTS

| Number | Country | Date |
|---|---|---|
| 456,373 | Great Britain | Nov. 9, 1936 |